July 14, 1925.
G. N. LILYGREN
1,546,293
VEHICLE CLOSURE
Filed Jan. 7, 1925
2 Sheets-Sheet 1
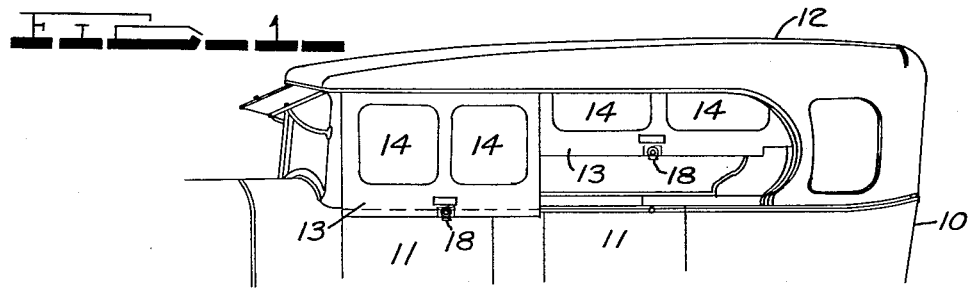
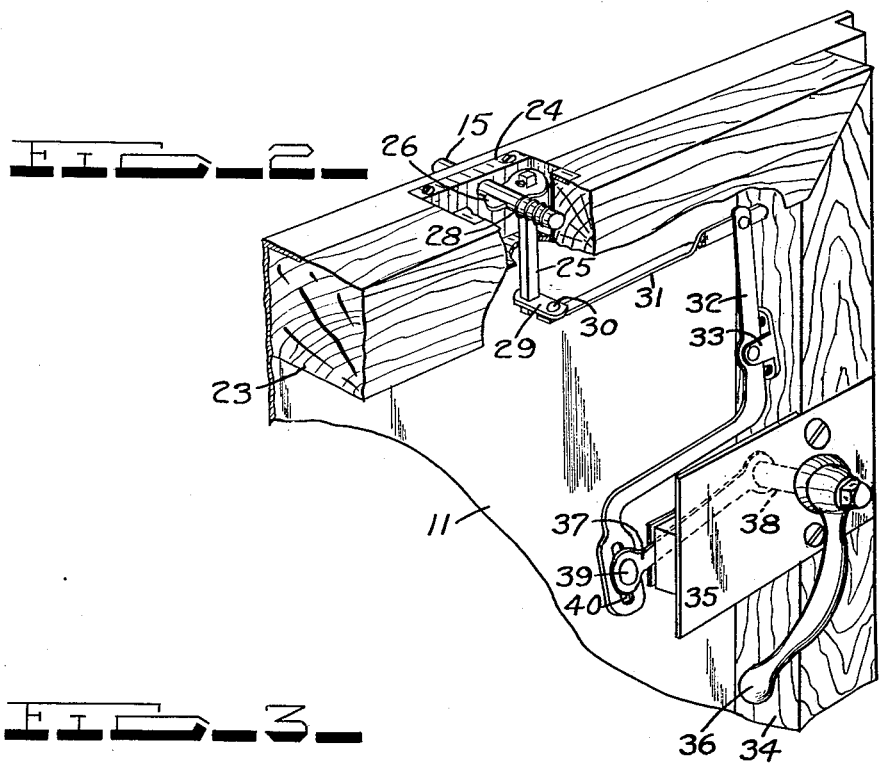
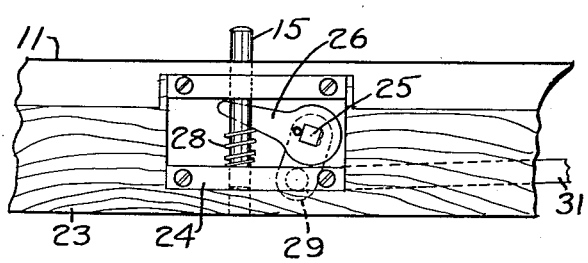
INVENTOR
GEORGE N. LILYGREN
BY
ATTORNEY July 14, 1925.
G. N. LILYGREN
VEHICLE CLOSURE
Filed Jan. 7, 1925
1,546,293
2 Sheets-Sheet 2
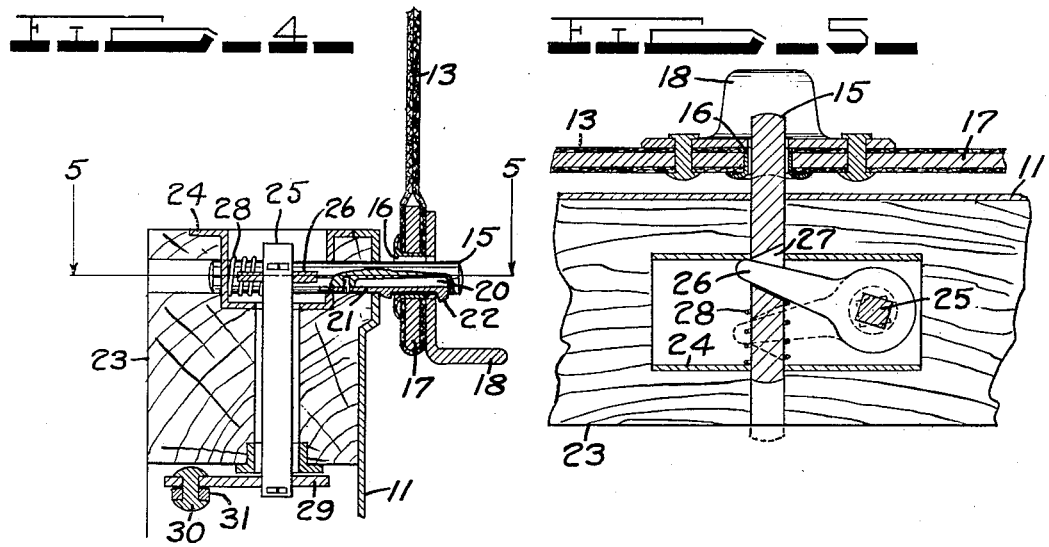
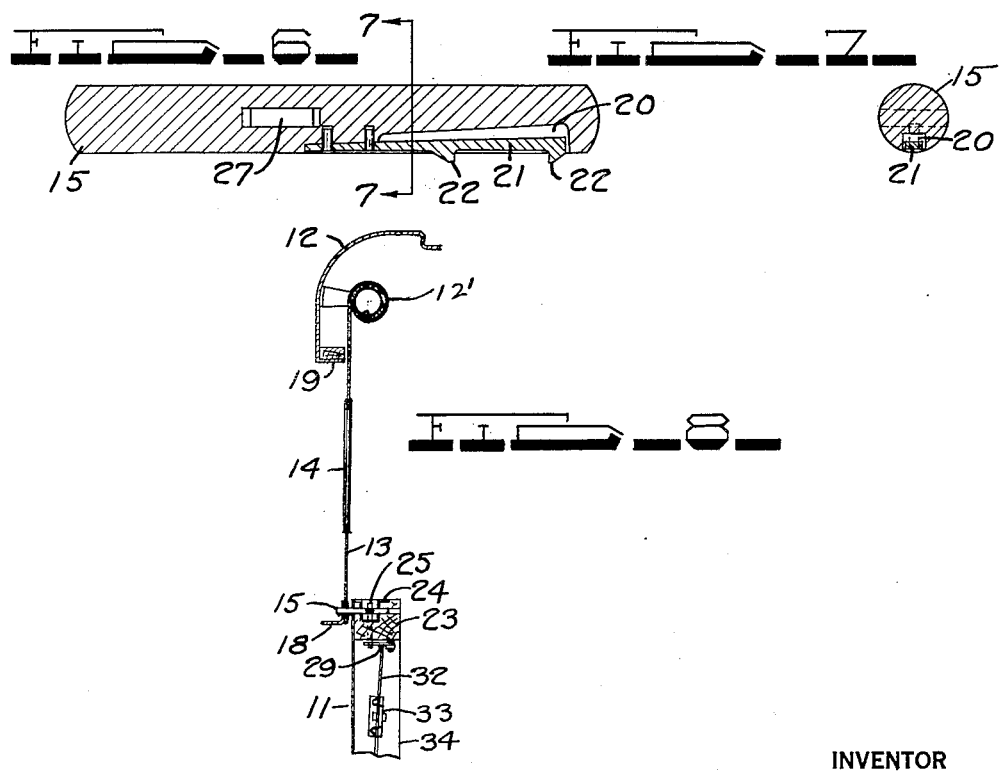
INVENTOR
GEORGE N. LILYGREN
BY
ATTORNEY Patented July 14, 1925.

1,546,293

UNITED STATES PATENT OFFICE.

GEORGE NELSON LILYGREN, OF DETROIT, MICHIGAN, ASSIGNOR TO THE STUDEBAKER CORPORATION, OF SOUTH BEND, INDIANA, A CORPORATION OF NEW JERSEY.

VEHICLE CLOSURE.

Application filed January 7, 1925. Serial No. 1,043. REISSUED

*To all whom it may concern:*

Be it known that I, GEORGE N. LILYGREN, a citizen of the United States of America, and resident of Detroit, in the county of Wayne and State of Michigan, have invented certain new and useful Improvements in Vehicle Closures, of which the following is a specification.

This invention relates to closures for vehicles and particularly to means for operating the same.

An object of this invention is to provide, in combination with a vehicle side enclosure provided with means for automatically withdrawing it into the vehicle top, of means for holding said enclosure in extended or operative position.

Another object is to provide means for releasing the enclosure from operative position so that it may be automatically withdrawn into the vehicle top.

Another object is to provide means for causing the enclosure to be automatically withdrawn into inoperative position upon turning of the latch of the door beneath the enclosure to be released.

Another object is to provide in a vehicle having a side curtain automatically withdrawable into the vehicle top, a catch for holding said closure in operative position above a door, and means operable by the movement of unlatching the door for releasing the catch whereby the side curtains automatically raise to inoperative position.

The above being among the objects of the present invention, the same consists of certain features of construction and combination of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Figure 1 is a perspective view of an open type automobile having side enclosures which may be of the roller or sliding type vertically withdrawable into the top thereof.

Figure 2 is a fragmentary perspective view of a door for the automobile illustrated in Figure 1, showing the mechanism operated by the door latch for releasing the curtain so that it may be raised to inoperative position.

Figure 3 is a fragmentary plan view of that portion of the upper edge of the door shown in Figure 2 which includes or which carries the curtain retaining member or catch and showing the adjacent portion of the mechanism employed to withdraw the catch into the door to release the curtain.

Figure 4 is a fragmentary sectional view taken transversely through the door, showing the curtain catch in engagement with the lower edge of the curtain and the adjacent portion of the mechanism employed for withdrawing the catch into the door.

Figure 5 is a fragmentary horizontal section taken on the line 5—5 of Figure 4 showing the curtain catch and the curtain retained thereby.

Figure 6 is an enlarged vertical sectional view taken centrally through the curtain catch.

Figure 7 is a transverse sectional view of the curtain catch taken on the line 7—7 of Figure 6.

Figure 8 is a fragmentary sectional view taken transversely through the automobile of Figure 1, showing the top and door and the relation of the curtain and curtain catch and catch operating mechanism in conjunction therewith.

In tops having side enclosures of the type which are vertically withdrawable into the same for inoperative position, such as of the roller or sliding type, difficulty has been experienced with the same due to their connection with the doors. Such curtains must usually overlap the doors to effect a complete enclosure and persons entering or leaving the vehicle often neglect or forget to raise the curtain before it is attempted to open such doors, with resulting damage to the curtain and discomfiture to the person so neglecting or forgetting to release the curtains.

To overcome this difficulty this invention contemplates and provides a mechanism whereby when an effort is made to open a door, the curtain above the same is automatically caused to raise, thereby leaving free access through the door when opened without danger of damage to the curtain. Although in the accompanying drawings, the present invention is illustrated in connection with an automobile having roller type side enclosures provided with the conventional spring actuated roller for causing it to wind up and thereby assume inoperative position, it will be evident that this invention is applicable to and includes those constructions in which the curtain slides, instead of rolling, up into the top to assume inoperative position.

The embodiment of the present invention shown in the accompanying drawings is in connection with an automobile body 10 having doors 11, top 12 and roller type side enclosures 13 supported in and adapted to be rolled up into the top 12 for inoperative position, each curtain being provided with a transparency 14 as is the conventional construction. Each curtain or side enclosure 13 is secured to a roller 12' positioned within the top 12, as illustrated in Figure 8, of a conventional construction which exerts a tendency to roll the curtain 13 about it, and thereby to withdraw the same into inoperative position within the top 12. As previously mentioned, sliding or other types of curtains having spring or other means exerting a tendency to withdraw the curtain into the top for inoperative position are equally applicable to this invention. In using such curtains it is evident that means must necessarily be provided for holding the same in extended position. This is accomplished in the embodiment shown by the use of a pin or catch 15 carried by and normally projecting from the side of each door 11 which is adapted to engage an opening 16 formed in the lower edge of the curtain 13 (see Figures 4, 5 and 8) and which passes through the curtain lower stiffening member 17, thereby preventing the same from being raised. On the outer side of the lower edge of the curtain 13 is secured a member 18 comprising a vertical leg provided with an opening matching the opening 16 for reception of the catch 15, and an outwardly extending horizontal leg adapted to engage the lower edge 19 of the top 12 (see Figure 8) when the curtain is raised, thereby preventing the curtain from being completely withdrawn, out of reach of the operator, into the top 12.

The lower face of the catch 15 is provided with a longitudinally extending slot or groove 20 in which is secured and in which operates a spring member 21. The spring member 21 is preferably secured at one end only, the opposite or outer end being provided with two downwardly projecting protuberances or ears 22 which project below the lower surface of the catch 15 and are adapted to be positioned on either side of the opening 16 extending through the curtain stiffening member 17 and member 18 and thereby prevent the curtain from inadvertently slipping off the catch 15, although the member 21 is sufficiently resilient to recede into the groove an amount necessary to bring the ears 22 out of contact with the sides of the opening 16 when a sensible effort is made to cause a relative movement of the curtain 13 longitudinally of the catch 15, thereby allowing the curtain 13 to be disengaged therefrom.

Inasmuch as the curtain 13 is being constantly urged to inoperative position in the top 12, and is normally prevented from doing so by the catch 15, it will be evident that if the curtain 13 is disengaged from the catch 15 it will immediately rise to inoperative position. The present invention contemplates such disengagement by two different methods; the first, by simply pulling the curtain 13 outwardly off of the catch 15, and the second, by withdrawing the catch 15 into the body out of engagement with the curtain 13. Also, the catch 15 in the last mentioned method is so connected with the door operating mechanism that upon opening the door 11, the catch 15 will be caused to recede into the door and allow the curtain 13 to recede into inoperative position. This release of the curtains is accomplished in the following manner. The catch 15 is longitudinally slidable in the upper door frame member 23, the frame being provided with a casing or recessed stamped member 24 set into the face of the door frame member 23 and having sufficient bearing surfaces to support the catch 15. Off-set from the catch 15 and also provided with a bearing in the casing member 24 is a vertically disposed rock shaft 25 having its lower end projecting below the door frame member 23 and connected with a radially disposed arm 26 at its upper end, the extending end of the arm 26 being received in a horizontally disposed slot 27 in the catch 15, so that rotary movement imparted to the shaft 25 causes a corresponding axial movement of the latch 15. A coil spring 28 surrounding the latch 15 within the casing member bears against the arm 26 and a side of the casing 24 to prevent rattling of the parts and cause the latch 15 to normally project beyond the edge of the door 11 as shown in Figures 4 and 5. An arm 29 is secured to the lower end of the shaft 25 and is pivotally connected by the pin 30 to the link 31 which in turn is connected to the upper end of the bell crank 32 which is pivoted in the plane of the door 11 on the bracket 33 secured to the door side frame member 34 on the opening side of the door 11. The lower end of the bell crank 32 is connected to the door latch 35 in such a manner that when the door latch handle 36 is turned to unlatch the door 11 to open the same, the bell crank 32 will be caused to rotate about its pivot and draw the link 31 and arm 29 with it, rotating the shaft 25 and arm 26 and thereby cause the curtain latch pin 15 to be drawn into the door 11, whereby the curtain 13 is released so that it is free to rise to inoperative position.

Although I have shown one specific method of actuating the bell crank 32 by the door latch 35, it will be evident that a variety of hook-ups between the two is within the province of an ordinary mechanic and this invention is not limited to the specific connection shown which consists of an arm 37 non-rotatably secured to the shaft 38 of the door latch handle 36, the end of the arm 37 being provided with a pin 39 which engages a slotted opening 40 in the lower end of the bell crank 32. The opening 40 is slotted to take care of any variations in manufacture and assembly that might occur. It will be evident that when the handle 36 is turned to unlatch the door 11, the free end of the arm 37 will raise and cause the bell crank 32 to turn about its pivot as previously described which in turn causes the curtain latch 15 to recede into the door 11, thereby releasing the curtain 13. It is preferred that the connection between the door latch 35 and curtain latch 15 be such that the curtain latch 15 is completely withdrawn into the door before the door latch is completely freed from its jamb so that it is capable of opening, thereby insuring that the curtain 13 will move out of contact with the door 11 before the latter can be opened.

It will be evident that the principle of the construction above described is applicable to any one of the great variety of styles of door latches on the market and that the form of the curtain catch may be either of the sliding type shown or of a pivoting or other type and that such is within the province of the ordinary mechanic and is within the present invention.

Formal changes may be made in the specific embodiment of the present invention without departing from the spirit and substance of the present invention, the scope of which is commensurate with the appended claims.

What I claim is:

1. The combination with a vehicle body having a door and a top mounted thereon, of a side enclosure above said door movable into the vehicle top for inoperative position, and means for releasing said side enclosure from operative position comprising a latch for holding the door in closed position, and means connected therewith for releasing said inclosure prior to the opening of said door.

2. The combination with a vehicle body having a top, a door, a latch mounted therein and a vertically movable side enclosure extensible therebetween, of means for normally urging said enclosure to inoperative position, means for holding said enclosure in operative position, and means for releasing said holding means upon movement of said latch to open said door.

3. In combination with a vehicle body having a top, a door, a latch mounted therein, and a side enclosure carried by the top and movable thereinto for inoperative position, of means normally urging said enclosure to inoperative position, a catch for engaging said curtain to hold it in operative position, and means operated upon movement of said latch for disengaging said catch from said curtain.

4. In combination with a vehicle body having a door and a top and a side enclosure extensible therebetween for operative position and withdrawable into said top for inoperative position, of a latch for holding said door in closed position, means for holding said enclosure in operative position, and means operated upon movement of said latch for disengaging said holding means from said enclosure.

5. In combination with a vehicle body having a top and a door, side enclosure extensible therebetween for operative position, and means normally urging said enclosure to inoperative position, of a catch for holding said enclosure in operative position, a latch for holding said door in closed position, and means connecting said catch and said latch whereby movement of said latch to permit opening of said door releases said catch from said enclosure to permit said enclosure returning to inoperative position.

6. In combination with a vehicle body having a top and a door and an enclosure extensible between the same for operative position and withdrawable into said top for inoperative position, a latch for said door, means for constantly urging said enclosure towards inoperative position, an opening in the lower edge of said enclosure, an axially slidable pin in said door normally projecting outwardly therefrom to engage said opening thereby to hold said enclosure in operative position, and linkages between said latch and said pin whereby movement of said latch to release said door from closed position operates to withdraw said pin from said opening thereby allowing said enclosure to rise to inoperative position.

7. In combination with a vehicle body having a top, a door and a curtain extensible therebetween for operative position, said curtain being constantly urged to inoperative position within said top, means for holding said curtain in operative position, a latch for holding said door in closed position, and means interconnecting said latch and said curtain holding means whereby movement of said latch to open said door releases said curtain from said curtain holding means, said interconnecting means releasing said curtain from said curtain holding means before said latch is sufficiently released to permit said door to be opened.

8. In combination with a vehicle having a top and body, and a curtain carried by said top extensible therefrom for operative position and withdrawable thereinto for inoperative position, means for holding said curtain in operative position comprising an opening in said curtain and a pin carried by said body adapted to be received in said opening, said pin having a groove and a spring element operable therein provided with a projection for retaining said curtain on said pin.

9. In combination with a vehicle having a top, a body having a door and a latch therefor, and a curtain supported by said top and extensible therefrom for operative position and withdrawable thereinto for inoperative position, a catch supported by said door for detachably holding said curtain in operative position, and means controlled by the movement of said latch for releasing said catch from said curtain whereby the same may be returned to inoperative position.

Signed by me at Detroit, Michigan, U. S. A., this 2nd day of January, 1925.

GEORGE NELSON LILYGREN.

Witnesses:
HODGSON G. PIERCE,
DONALD B. WAITE.